No. 863,744.　　　　　　　　　　　　　　　PATENTED AUG. 20, 1907.
E. D. NELSON & W. L. BROWN.
AIR BRAKE COUPLING.
APPLICATION FILED FEB. 20, 1906.
2 SHEETS—SHEET 1.
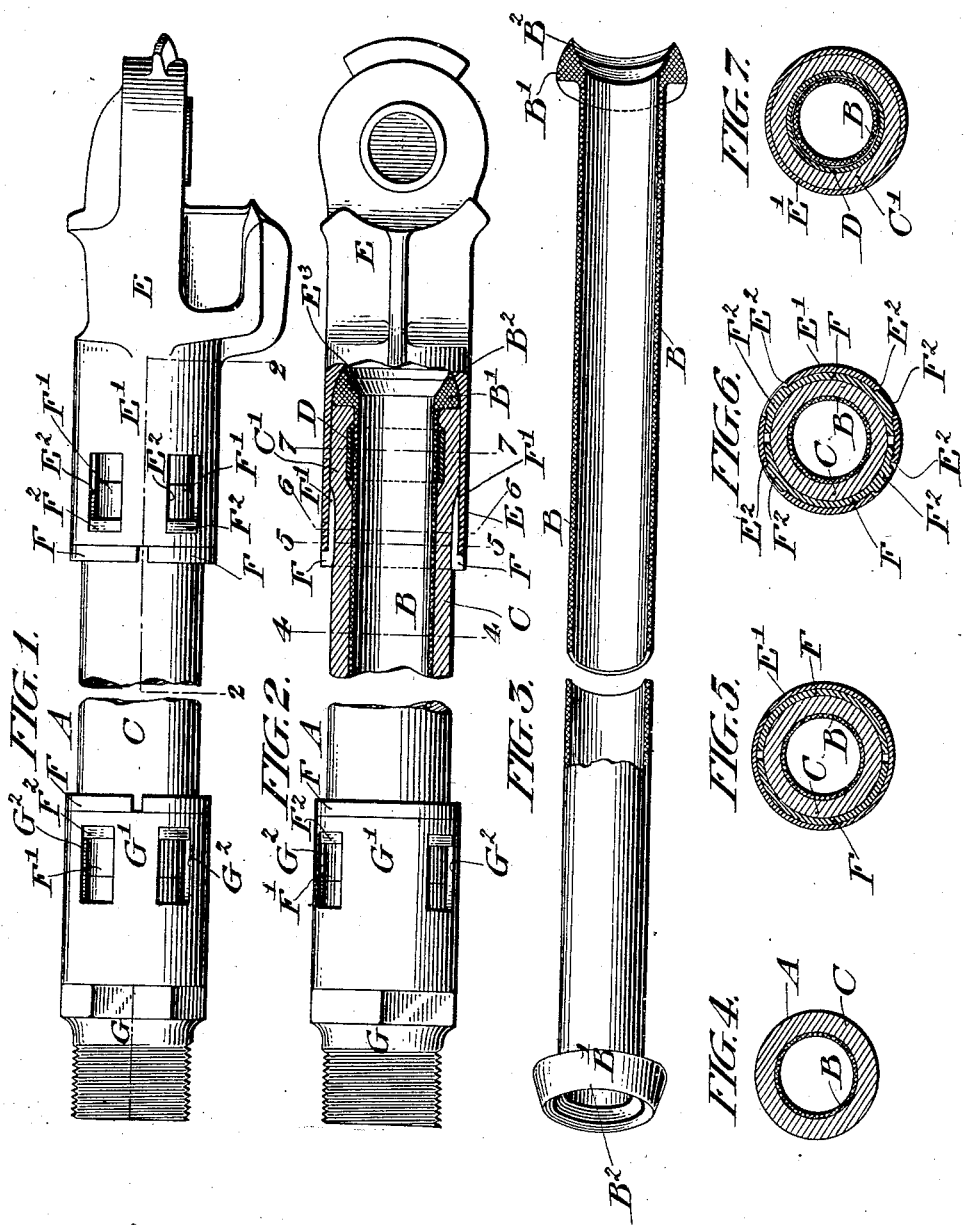
WITNESSES:
INVENTORS
ATTORNEY.

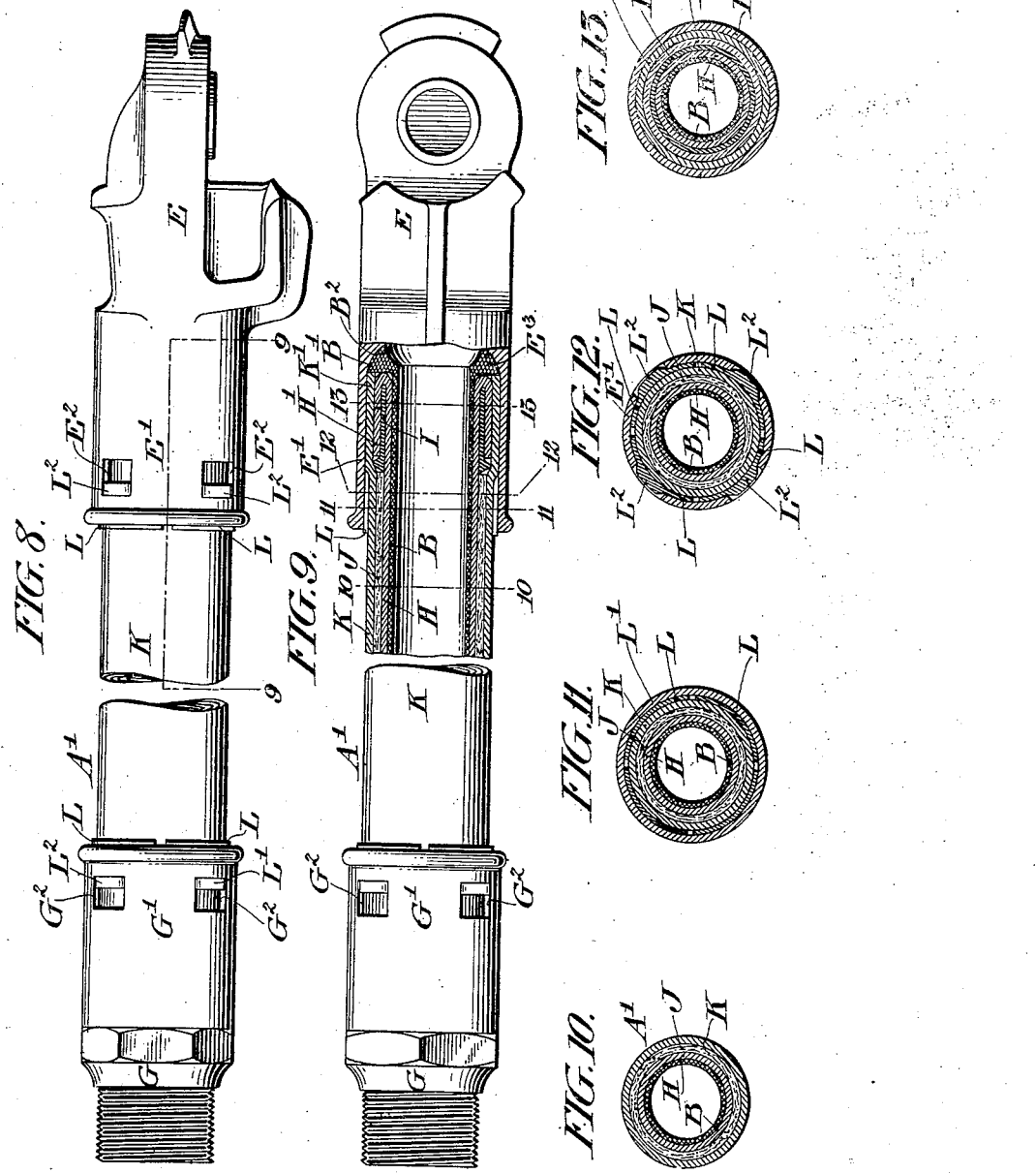

UNITED STATES PATENT OFFICE.

EDWARD D. NELSON AND WILLIAM L. BROWN, OF ALTOONA, PENNSYLVANIA.

AIR-BRAKE COUPLING.

No. 863,744.         Specification of Letters Patent.         Patented Aug. 20, 1907.

Application filed February 20, 1906. Serial No. 302,013.

*To all whom it may concern:*

Be it known that we, EDWARD D. NELSON and WILLIAM L. BROWN, both citizens of the United States of America, residing in the city of Altoona, in the county of Blair and State of Pennsylvania, have invented certain new and useful Improvements in Air-Brake Couplings, of which the following is a true and exact description, reference being had to the accompanying drawings, which form a part thereof.

Our invention relates to air pipe coupling hose such as is used in connection with the air brake system for connecting the air pipes of coupled cars.

As heretofore constructed the air hose used for coupling the pipes has generally been made of a compound structure of rubber and fabric of such character that the occurrence of a leak in the hose as a rule disrupted the structure permitting a rapid escape of air under pressure and the consequent sudden or emergency application of the brakes.

It is the object of our invention to provide a hose for coupling the air pipes which on the occurrence of leak will be free from the tendency to disruptive destruction and will confine the leak to the minimum amount insufficient to cause an emergency application of the brakes while under ordinary conditions the hose is as strong, tight and serviceable as any of the usual structures.

Broadly speaking our invention consists in constructing the coupling hose of an inner rubber tube surrounded and strengthened by, but not incorporated with or attached to an outer fabric tube permeable to air through the interstices of the fabric. By preference we make our hose with an intermediate fabric strengthening tube coming in direct contact with the inner rubber tube and of sufficient strength to resist the pressures to which the hose is exposed and we surround this intermediate tube by an outer fabric tube serving, primarily, the purpose of a wearing tube to protect the strengthening tube. This wearing tube may, if desired, be painted or coated to prevent the absorption of water, but the protecting layer, whatever its character may be, should not be of such a character as to offer any considerable resistance to the escape of air from within. For the best results we prefer to use between the intermediate strengthening tube and the wearing tube a tube or jacket of felt or similar material permeable to air and having the function of distributing the pressure of any air leaking from within.

Another feature of our invention consists in making the inner rubber tube longer than the outer fabric tubes by which it is surrounded and providing it with annular outwardly extending shoulders adapted to abut against the ends of the fabric tubes and for the best results these shoulders should be provided with flexible outwardly extending edges and this structure is connected at the ends with the sockets of metallic coupling ends so that the pressure within the hose will press the flexible lips against the sockets of the metallic ends, thus insuring airtight joints.

Reference being now had to the drawings in which our invention is illustrated, Figure 1 is a plan view of an air pipe coupling hose constructed in accordance with our invention. Fig. 2, is a side elevation of the hose shown partly in section on the line 2—2 of Fig. 1. Fig. 3, is a plan view of the inner rubber tube in its preferred form, partly shown in central section. Figs. 4, 5, 6 and 7, are cross-sections on the line 4—4, 5—5, 6—6 and 7—7 of Fig. 2. Fig 8 is a plan view of another and preferred modification of our hose. Fig. 9 is a side elevation of the hose shown partly in section on the line 9—9 of Fig. 8, and Figs. 10, 11, 12 and 13 are cross-sections on the lines 10—10, 11—11, 12—12 and 13—13 of Fig. 12.

In the construction shown in Figs. 1 to 7, A, indicates the hose, made up of the inner rubber tube B, having the enlarged annular heads B', with flexible lips $B^2$.

C, is the outer fabric tube having enlarged heads, as shown at C'; these heads being stiffened by metallic rings, such as are shown at D, Figs. 2 and 7.

E, and G, are the metallic couplings, each having sockets E', and G', adapted to receive the enlarged heads of the hose as shown in Fig. 2. The sockets are formed with slots, as indicated at $E^2$, $G^2$, etc., and the inner ends of the sockets are preferably formed with rounded segments, such as are shown at $E^3$, at their inner ends; the ends of the hose being inserted in the sockets, the hose is secured in place by means of keys F, having, preferably, tapered ends F', and shoulders $F^2$, which, when the keys are thrust into the mouth of the sockets, engage in the slots $E^2$, locking the keys in position, the keys effectually securing the hose in the sockets.

In the construction shown in Figs. 8 to 13, the inner rubber tube B, is shown as surrounded by strengthening tube H, which in turn is inclosed in a jacket of felt indicated at J, the felt jacket being again inclosed in an outer wearing tube K. The enlarged end of the hose of this construction is formed by turning the end H', of the strengthening tube over a metal ring I, the enlarged end of the tube K, being drawn over this and forming the enlargement K'. In all other features of construction this modification is substantially like that already described, the keys, somewhat changed in form, being indicated at L, and their locking shoulders at $L^2$.

The coupling socket and the mode of securing the hose therein is broadly applicable to old as well as our new forms of hose and forms the subject matter of our copending application filed February 20, 1906 Serial Number 303,014 being only claimed in this case in combination with the special form of hose.

Having now described our invention what we claim as new and desire to secure by Letters Patent is

1. In an air brake system, an air pipe connection including a coupling hose having metallic end couplings and a flexible body, said body having an inner rubber tube surrounded by an outer fabric tube permeable to air through the interstices of the fabric and entirely disconnected with, but supporting the inner tube, and of sufficient strength to prevent a serious deformation and rupture of the inner tube on the formation of an initial leak therein, thereby preventing said leak from causing an emergency application of the air brakes.

2. In an air brake system, an air pipe connection including a coupling hose having metallic end coupling members and a flexible body, said body having an inner rubber tube, in combination with an outer fabric strengthening tube entirely disconnected with the rubber tube, a cover of felt and an external wearing tube permeable to air, whereby an initial leak in the inner tube is prevented from causing a serious deformation and rupture of the inner tube and the leakage is restricted to prevent an emergency application of the brakes.

3. In an air brake system, an air pipe connection including a coupling hose having an inner rubber tube formed with outwardly extending annular shoulders at its ends in combination with an outer fabric tube permeable to air through the interstices of the fabric and entirely disconnected with the rubber tube, said fabric tube surrounding the rubber tube and abutting against its annular shoulders.

4. In an air brake system, an air pipe connection including a coupling hose having an inner rubber tube formed with outwardly extending annular shoulders at its ends provided with flexible outer lips in combination with an outer fabric tube permeable to air through the interstices of the fabric and entirely disconnected with the rubber tube said fabric tube surrounding the rubber tube and abutting against its annular shoulders, metal heads having sockets adapted to receive the ends of the compound hose and fit against the flexible lips of the annular shoulders of the rubber tube.

EDWARD D. NELSON.
WILLIAM L. BROWN.

Witnesses:
S. S. METZ,
GEO. M. METZ.